US006045403A

United States Patent [19]

Werner et al.

[11] Patent Number: 6,045,403

[45] Date of Patent: Apr. 4, 2000

[54] LINE CONNECTOR BETWEEN TWO ELECTRIC LINES

[75] Inventors: Juergen Werner, Stuttgart; Karl-Heinz Effenberger, Schwäbisch Gmünd; Johann Wehrmann, Stuttgart; Siegbert Heil, Heilsbronn; Klaus Kamm; Heinz Dieter Schmitz, both of Dinkelsbuehl, all of Germany

[73] Assignee: Robert Bosch GmbH, Stuttgart, Germany

[21] Appl. No.: 09/043,866

[22] PCT Filed: Jun. 3, 1997

[86] PCT No.: PCT/DE97/01107

§ 371 Date: Oct. 7, 1998

§ 102(e) Date: Oct. 7, 1998

[87] PCT Pub. No.: WO98/06151

PCT Pub. Date: Feb. 12, 1998

[30] Foreign Application Priority Data

Aug. 1, 1996 [DE] Germany .......................... 196 31 040

[51] Int. Cl.[7] ...................................................... H02G 3/18

[52] U.S. Cl. ......................... 439/587; 174/65 SS; 174/76

[58] Field of Search .................................... 439/604, 606, 439/589; 174/65 G, 65 SS, 76, 77 R, 72 C, 85, 93, 88 R, 92

[56] References Cited

U.S. PATENT DOCUMENTS

| | | | |
|---|---|---|---|
| 3,240,868 | 3/1966 | Ets-Hokin et al. | 174/93 |
| 3,597,527 | 8/1971 | Lusk | 174/88 R |
| 3,673,311 | 6/1972 | Misare | 174/88 R |
| 3,902,006 | 8/1975 | Gouteron et al. | 174/76 |
| 4,310,211 | 1/1982 | Bunnell et al. | 439/358 |
| 4,343,526 | 8/1982 | Hobson et al. | 439/273 |
| 4,381,425 | 4/1983 | Maricevic et al. | 174/93 |
| 4,614,390 | 9/1986 | Baker | 439/587 |
| 4,632,487 | 12/1986 | Wargula | 174/65 SS |
| 5,331,114 | 7/1994 | Rudolph | 174/93 |
| 5,724,730 | 3/1998 | Tanaka | 174/76 |
| 5,920,035 | 7/1999 | Haney et al. | 174/65 SS |

FOREIGN PATENT DOCUMENTS

| | | |
|---|---|---|
| 0 033 031 | 8/1981 | European Pat. Off. . |
| 41 02 989 | 5/1992 | Germany . |
| 2168548 | 6/1986 | United Kingdom . |

*Primary Examiner*—Neil Abrams
*Attorney, Agent, or Firm*—Kenyon & Kenyon

[57] ABSTRACT

A line connector connecting a first electric line which has a first contact connection portion and a second electric line which has a second contact connection portion. The line connector includes an enclosing tube which surrounds the first electric line and which has an end portion. The end portion is embedded in a plastic extrusion coat. The first and second contact connection portions are also provided in the plastic extrusion coat. The line connector also includes a sealing device which is situated on the end portion of the enclosing tube. Furthermore, the line connector includes a clamping device which is encased by the plastic extrusion coat and which radially presses a seal element of the sealing device on the enclosing tube.

16 Claims, 5 Drawing Sheets

LINE CONNECTOR BETWEEN TWO ELECTRIC LINES

FIELD OF THE INVENTION

The invention present relates to a line connector between two electric lines, preferably for connecting the (first) line, especially a high-temperature line, of a measuring sensor to the (second) line, especially a PTFE polytetrafluoroethylene-insulated line, of a wiring, in particularly of a wiring harness

BACKGROUND INFORMATION

In order to contact the electric lines of a measuring sensor, especially of a planar lambda probe, to the lines of a wiring harness usually used in motor-vehicle construction, and to protect this junction from outer influences, it is known to extrusion coat with plastic around the contact joints after making the electrical connection. Since the lambda probe is subject to high temperatures, its electric line is a high-temperature line which is surrounded by an enclosing (sheathing) tube. The individual wires of the sensor are guided in the enclosing tube, insulated from one another in a mineral powder. As mentioned above, the electrical contact joints of the two lines, together with the end area of the enclosing tube, are embedded in the plastic extrusion coat. The transition zone between the enclosing tube and the plastic extrusion coat represents a weak point which, due to environmental influences and especially because of the different materials (metal/plastic), may not remain impervious over the service life, so that moisture and foreign matter can penetrate therein. This can lead to shunts of the electric conductors. It is also possible, viewed over the service life, for the transition zone (enclosing tube, plastic extrusion coat) to be mechanically damaged, resulting in a pulling-apart, twisting, or the like, whereby a breakdown of the sensor functioning can occur.

SUMMARY OF THE INVENTION

A line connector according to the present invention is advantageous in that, because of the seal arranged on the end area of the enclosing tube and pressed radially on the outer side of the enclosing tube, an additional protection is provided, the seal also being embedded into the extrusion coat. Thus, even if permeability occurs between the enclosing tube and the extrusion coat due to environmental influences/vibrations, etc., this will not result in moisture and foreign matter being able to penetrate to the contact joints of the two lines, since it is prevented by the seal. The seal pressed firmly onto the surface of the metal tube also provides the line connector with a high mechanical strength, so that besides the electrical functional reliability, the mechanical long-term stability is also assured.

According to another embodiment of the invention present, the clamping device is formed by a housing accommodating the seal. Consequently, the seal is surrounded by the housing, the housing exerting radial force on the seal which presses it firmly against the surface of the enclosing tube.

In particular, the housing has a two-part construction, the radial pressure of the sealing device on the metal tube being effected by the assembly of the two housing parts. Therefore, the result of the radial movement of the two housing parts is that corresponding housing parts move toward the seal to press it against the enclosing tube.

It is advantageous if the two housing parts are able to latch together axially. This permits a very simple housing assembly, since it is merely necessary to move the two housing parts, slipped onto the enclosing tube, axially toward each other, the housing parts applying the force on the sealing device. During the final phase of this axial shift, the two parts latch together, the radial pressure applied on the seal being maintained.

According to a further embodiment of the invention present, the inner side of the housing at least partially forms an abutting (i.e., contacting) wedge for the seal. A "abutting wedge" means a formation of at least one part of the housing which, because of a surface inclined toward the axial direction, thus inclined toward the center axis of the enclosing tube, exerts a force on the seal due to the axial shift, the force acting according to the wedge principle. Preferably, the abutting wedge can have a cone shape extending circumferentially. In addition, or alternatively, it is also possible for the outer side of the sealing device at least partially to form the abutting wedge, so that due to a relative movement taking place between the seal and the housing during assembly, the radial force is applied.

According to yet another embodiment of the invention present, the housing is made of the same material as the extrusion coat. This has the advantage that, during the extrusion-coating process, which is preferably carried out at approximately 300 to 400° C., the surface of the housing partially melts, so that an intimate joining takes place with the material fed during the extrusion coating process. After completing the extrusion coating process, a quasi one-piece part results which also includes the "original" housing.

It is advantageous if the metal tube has a collar, particularly an annular collar, against which the facing end of the housing or of the seal abuts. This offers a simple and manufacturing-compatible assembly. In addition, the collar forms an additional protection against the penetration of moisture and foreign matter. The collar is preferably secured with form locking on the enclosing tube by caulking and/or welding.

In addition, an inner-conductor positioning part, also embedded into the extrusion coat, is braced against the housing. This positioning part is used to fix in position the inner conductors, which are bent in form, of the first line, the bracing of the positioning part against the housing producing a certain inherent rigidity of the overall arrangement, and thus good mechanical properties existing overall. In particular, the inner-conductor positioning part to catches on the housing. This offers an additional fixation during assembly and ensures that all the parts occupy their intended position during the extrusion-coating process.

It is also advantageous if the annular collar does not have a circular surface area and/or is not designed to be flat. This has the advantage that, given torsional stress, that is when the enclosing tube twists relative to the extrusion coat, a perceptibly higher protection against torsion is provided, so that torsional stresses are intercepted and diverted onto the enclosing tube.

DETAILED DESCRIPTION OF THE DRAWINGS

Figure 1:
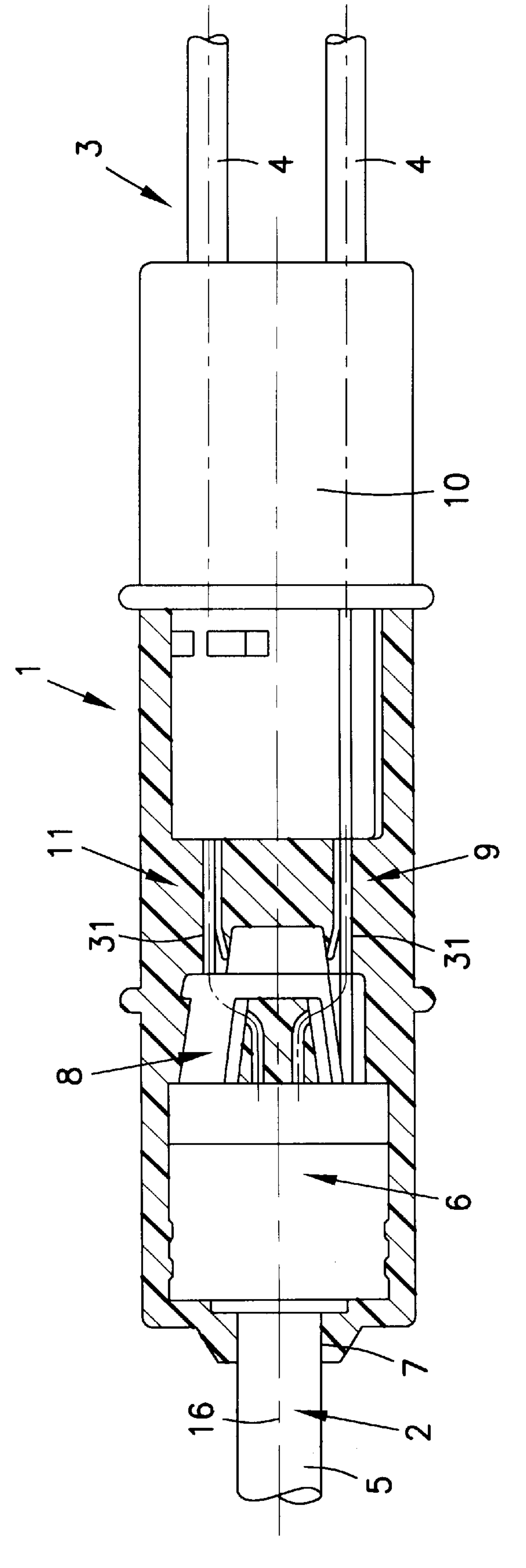
FIG. 1 shows a partially cut open view of a line connector according to the present invention.

FIG. 1 shows a line connector 1 which is used for the electrical and mechanical connection of a first electric line 2 to a second electric line 3 and also to protect against environmental influences. Second line 3 is in the exemplary composed of four single conductors 4 (only two single conductors are illustrated in FIG. 1, since in each case, two conductors lie congruently relative to each other). First line 2 leads to a measuring sensor, not shown, for example to a planar lambda probe. Since in the motor vehicle, the lambda probe is at a location which is subject to high temperatures, first line 2 is a high-temperature line. First line 2 has four single conductors (not visible in FIG. 1) located in an enclosing tube 5. The single conductors are insulated from one another by mineral powder contained in enclosing tube 5. Enclosing tube 5 is made of metal. Single conductors 4 of second line 3 belong to a wiring harness of the motor vehicle, the cables of the wiring harness being formed by PTFE-insulated lines. Thus, they are the usual electric lines used in motor-vehicle technology. Line connector 1 connect the high-temperature line to the wiring harness.

As shown in FIG. 1, line connector 1 has a sealing device 6, end area 7 of enclosing tube 5 extending into sealing device 6. Contiguous to sealing device 6 is an inner-conductor positioning part 8, followed—in the direction toward the wiring harness—by contact-connecting zone 9 which joins a contact-positioning aid 10, out of which single conductors 4 emerge. Sealing device 6, end area 7, inner-conductor positioning part 8, contact-connecting zone 9 and optionally also contact-positioning aid 10 are embedded into a plastic extrusion coat 11. Therefore, line connector 1 is created under alignment of the single conductors and the electrical connection of the single conductors of first line 2 to second line 3, and the extrusion coating with plastic then carried out.

Figure 2:
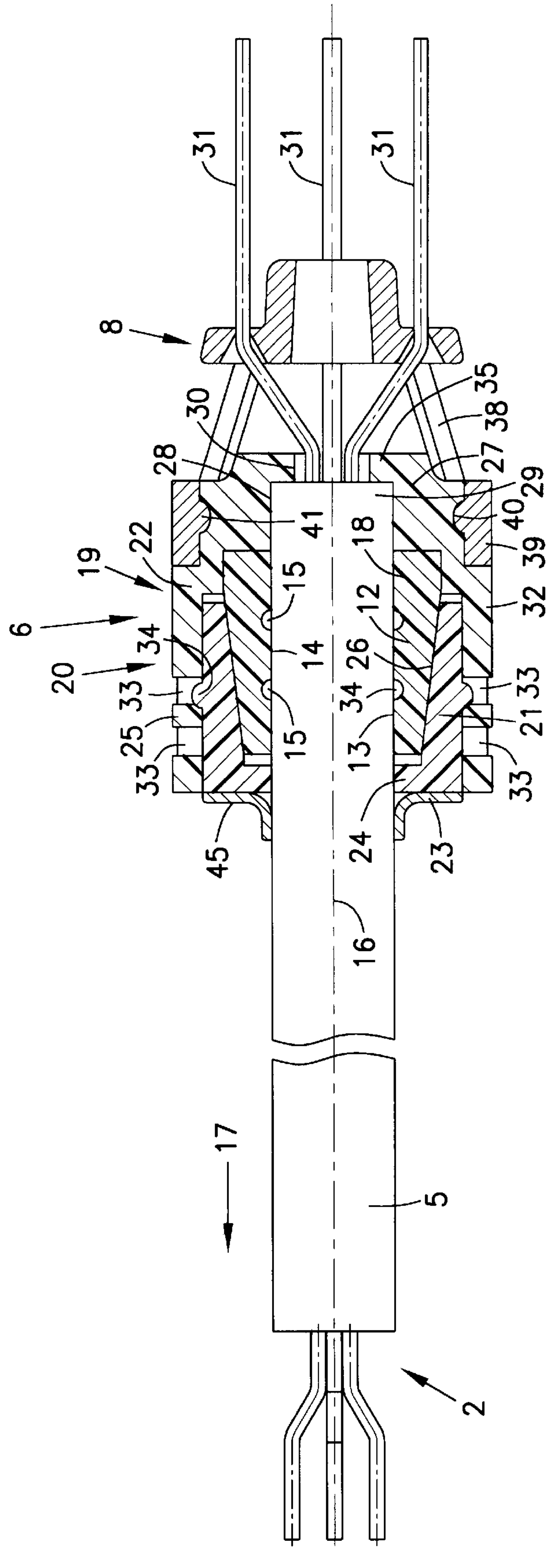
FIG. 2 shows a longitudinal section through an area illustrated in FIG. 1.

FIG. 2 shows the area of sealing device 6 and of inner-conductor positioning part 8 of the arrangement illustrated in FIG. 1. Sealing device 6 has a seal 12 made preferably of a high-temperature-resistant elastomer, especially Viton. Seal 12 has a feed-through opening 13 whose unobstructed inside diameter—given an undeformed seal—is larger than the outside diameter of enclosing tube 5. In addition, introduced into inner wall 14 of feed-through opening 13 are two annular grooves 15, having clearance from one another, which ensure that the areas of inner wall 14 adjoining annular grooves 15 can conform to the outside of enclosing tube 5. Furthermore, annular grooves 15 form steps (or gradation) in the material of seal 12 which abut against the surface of enclosing tube 5 and, in this respect, form barriers against substances penetrating from the outside. The shaping of seal 12 corresponds to a truncated cone which along its center longitudinal line 16—is penetrated by feed-through opening 13. The truncated cone is mounted, and aligned toward end area 7 of enclosing tube 5 in such a way that the smaller diameter shows in the direction toward the lambda probe (i.e., arrow 17). Contiguous to the area of the truncated cone having the largest diameter is a short, circular-cylindrical segment 18 of seal. Cylindrical segment 18 is being formed in one piece with the frustoconical segment.

Figure 3:
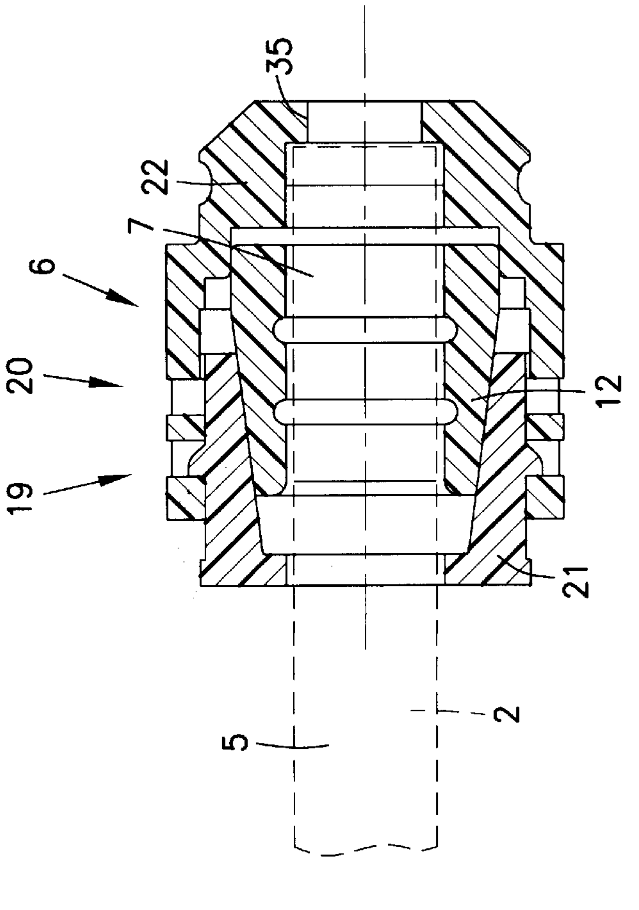
FIG. 3 shows a longitudinal section through a sealing device illustrated in FIG. 1.

Seal 12 is surrounded by a clamping device 19 which forms a housing 20 that is made of a first housing part 21 and a second housing part 22. First housing part 21, as well as second housing part 22 are rotationally symmetrical parts around the line indicated by 16. First housing part 21 has a base 23 which is penetrated by an opening 24 whose diameter corresponds to the outside diameter of enclosing tube 5. Contiguous to the base—pot-shaped—is a side wall 25 whose inner side 26 flares out with regard to the longitudinal extension of line 16, i.e. inner side 26 runs in the shape of a cone. The angle of inclination of cone-shaped inner side 26 corresponds to the angle of inclination of the outer side of the frustoconical formation of seal 12. Therefore, in the assembled state (shown in FIG. 2), inner side 26 rests flat on the outer side of frustoconical seal 12. The height of side wall 25 is selected in such a way that—as shown in FIG. 2—it does not extend beyond seal 12, but rather reaches only approximately to circular-cylindrical segment 18 of seal 12. Second housing part 22 is likewise pot-shaped, and has a base 27 which is penetrated by a stepped bore (graduated) hole 28 , the area of stepped bore hole 28 having the larger diameter receiving end 29 of enclosing tube 5. Area 30 of stepped bore hole 28 having the smaller diameter is used for the lead-through of inner conductors 31 of first line 2. Integrally joined to base 27 is an annular side wall 32 which broadens by steps towards the free end. The inner area of second housing part 22 having the smaller diameter accommodates circular- cylindrical segment 18 of seal 12, while the area of side wall 32 having the larger diameter covers side wall 25 of first housing part 21. The contiguous zones of the two side walls 25 and 32, thus the outer side of side wall 25 and the inner side of side wall 32, are circular-cylindrical, so that the two housing parts 21 and 22 can be pushed axially into one another. Side wall 32 has a plurality of openings 33—distributed over its periphery—two openings 33 always lying set apart relative to each other—viewed in longitudinal extension (line 16). Entering into openings 33 are detents 34 located on the outer side of side wall 25. In this manner, when the two housing parts 21 and 22 are pushed axially together, initially a pre-latch position is attained which consists in detents 34 entering openings 33 situated on the edge. The intention is then to bring about (i.e., reach) the final latch position, the two housing parts 21 and 22 are pushed axially further together, so that detents 34 leave the momentarily used openings 33 and enter openings 33 lying beyond in a graded manner. This position is shown in FIG. 2. This assembly operation is implied clearly from a comparison between FIGS. 3 and 2. FIG. 3 shows the pre-assembly position, i.e. the two housing parts 21 and 22 are latched in an axial position in which they are not yet completely pushed together. It is apparent that, in this pre-latch position, feed-through opening 13 lies opposite the outer surface area of enclosing tube 5 with slight play. If the two housing parts 21 and 22 are now transferred into the final latch position as shown in FIG. 2, conical inner side 26 slides along on the frustoconical outer side of seal 12, thus pressing seal 12 radially onto enclosing tube 5. Therefore, housing 20 forms clamping device 19, describe above, which is used to firmly press on seal 12. This press-on position is fixed by latching the two housing parts 21 and 22 in their final latch position (shown in FIG. 2). It is also important that, because of stepped bore hole 28, a collar 35 jutting inwardly is formed in area 30 having the smaller diameter, collar 35 radially covering the end of enclosing tube 5 and, thus, forming a further barrier for moisture, etc., penetrating from outside along enclosing tube 5.

Figure 4:
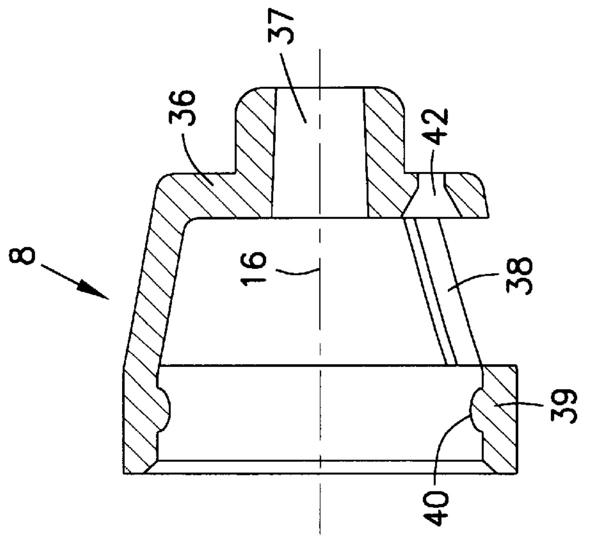
FIG. 4 shows a longitudinal section through an inner-conductor positioning part illustrated in FIG. 1.

Inner-conductor positioning part 8 is not shown in detail in FIGS. 2 and 4. Positioning part 8 has a basket-like design and has a base region 36 that is penetrated by a center bore hole 37. Center bore hole 37 helps to ensure that liquefied plastic molding material reaches the basket interior during the extrusion-coating process, described in detail below. Emanating from base region 36 are basket arms 38 which—diverging at an angle with respect to line 16—change integrally into a peripheral ferrule 39. Peripheral ferrule 39 has detent projections 40 on its inner side, or provision is made there for an annular projection, the detent and annular projections, respectively, in the final assembly position, entering a corresponding receiving depression(s) 41 which, for example, can be constructed as an annular groove. Receiving depression 41 is located in the area of second housing part 22 having the smaller diameter. If inner-conductor positioning part 8 is clipped axially onto second housing part 22 (see FIG. 2), then the outside diameter of peripheral ferrule 39 is in alignment with the outside diameter of the area of side wall 32 having the larger diameter. To fix inner conductors 31 in position, base region 36 is penetrated by guide holes 42 that receive inner conductors 31, fixing them in position.

Figure 5:
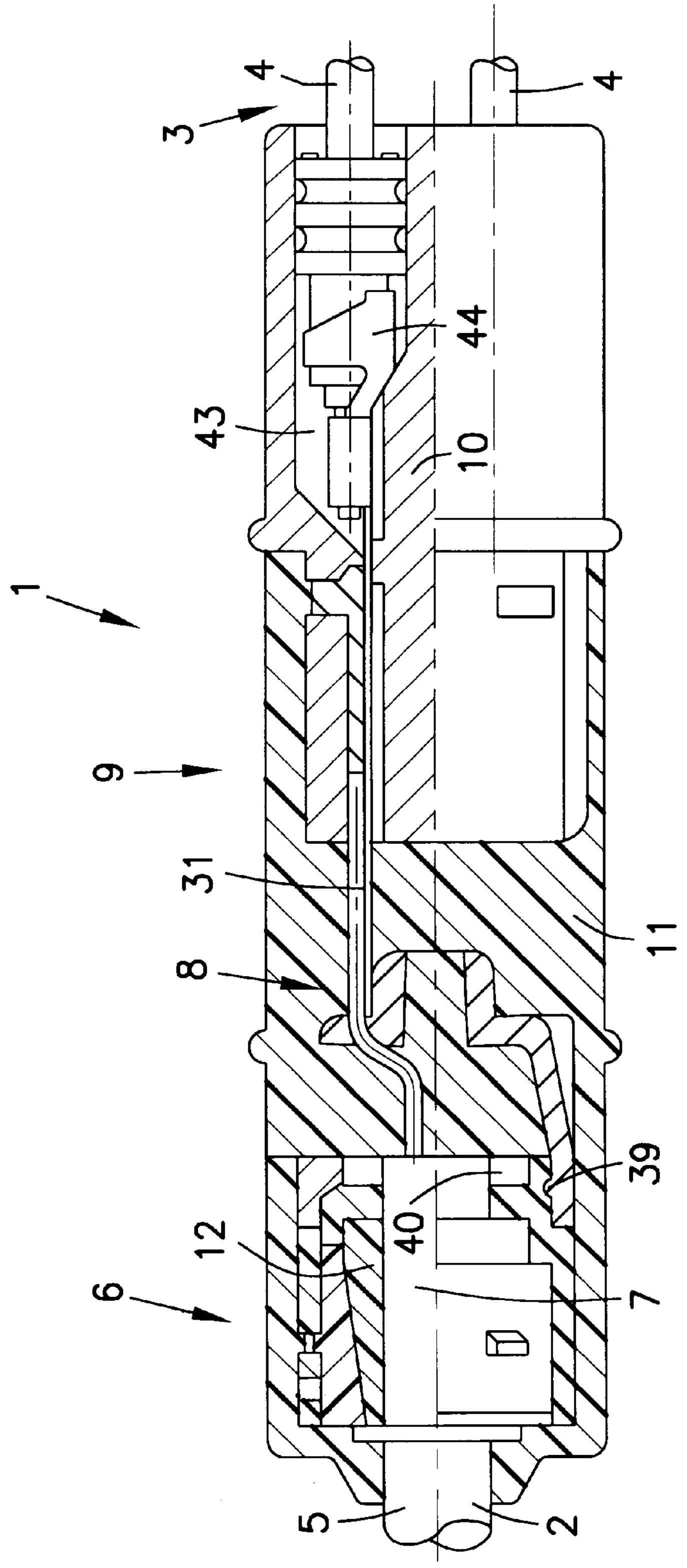
FIG. 5 shows a further sectional view of the line connector illustrated in FIG. 1.
Figure 6:
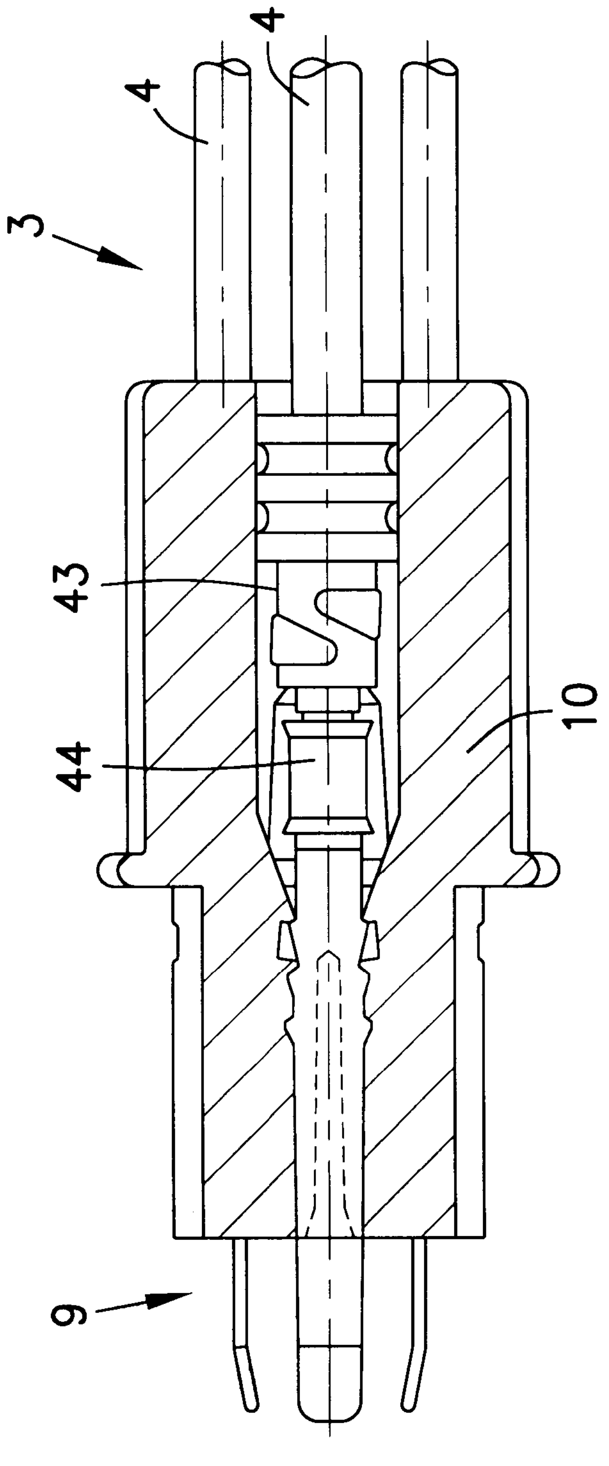
FIG. 6 shows a further detailed view of the line connector illustrated in FIG. 5.

As shown in to FIGS. 5 and 6, line connector 1 also has contact-connecting zone 9, describe above, and contact-positioning aid 10. Contact-positioning aid 10 is a part, provided with longitudinal bore holes 43, into which contact elements 44 are inserted in a manner that they catch. These contact elements 44 are electrically connected to single conductors 4 of second line 3. Moreover, inner conductors 31 of first line 2 are electrically connected in the area of contact-connecting zone 9 to contact elements 44, thus to single conductors 4. This can be effected, for example, by a crimping process and/or by welding. An exemplary embodiment of this electrical connection is not discussed in detail herein, since it can be effectuated in different ways and does not represent the essential subject matter of the invention present.

For mechanical stabilization and a positioning aid during assembly, as well as for forming another barrier against moisture and foreign matter, respectively, an annular collar 45 is applied on enclosing tube 5, disposed with clearance with respect to the end of enclosing tube 5. Annular collar 45—viewed in the direction of center longitudinal line 16—preferably has a surface area which is not circular, (Such as an oval) or not flat, in order—as describe below—to form a torsional protection for line connector 1.

The assembly of line connector 1 of the present invention as well as the extrusion coating with plastic is described below.

For the assembly of line connector 1 according to the invention present, it is merely necessary to slide first housing part 21 onto enclosing tube 5 until first housing part 21 strikes against annular collar 45. Seal 12 is subsequently slipped over enclosing tube 5. Second housing part 22 is then slid onto enclosing tube 5, side wall 32 covering side wall 25 of first housing part 21. When the two housing parts 21 and 22 are further pushed together, pre-fixation position, shown in FIG. 3, is occupied which, in this respect, forms an assembly aid. The two housing parts 21 and 22 are subsequently pushed further axially together, until the final latch position as shown FIG. 2 is reached. In this position—as describe above—seal 12 is radially pressed firmly onto the outer side of enclosing tube 5. Alternatively, the parts indicated are first pre—latched, and then slid as a subassembly onto enclosing tube 5. Inner conductors 31 of first line 2 are now bent in form and are threaded into guide holes 42 of inner-conductor positioning part 8. Inner-conductor positioning part 8 is then latched on housing 20. As shown in FIG. 2, in the final assembly position, housing 20 abuts with its one end against annular collar 45, and that annular collar 35 terminates with the end of enclosing tube 5, thus surrounding it in the radial extension. In the course of the further assembly work, contact-positioning aid 10 then affixes single conductors 4 of second line 3, provided with contact elements 44, being affixed in contact-positioning aid 10 in a manner that they catch. Subsequently, the electrical contacting work is carried out between conductors 4 of second line 3 and inner conductors 31 of first line 2. When this work is concluded, the extrusion coating with plastic (plastic extrusion coat 11) is carried out. For that purpose, the entire arrangement is introduced into a corresponding mold which is then filled with plastic (plastic injection-molding process). A plastic extrusion coat encasing the entire arrangement results, which is indicated in FIG. 1 with crossing shading lines. It is clear that annular collar 45 is also embedded in plastic extrusion coat 11. Thus, all in all, a mechanically stable and reliable barrier against the penetration of foreign matter is produced with respect to enclosing tube 5. Contact-positioning aid 10 can be completely accommodated in plastic extrusion coat 11, or—according to another exemplary embodiment—can be only partially accommodated therein (i.e., a longitudinal section of contact-positioning aid 10 may be accommodated).

What is claimed is:

1. A line connector connecting a first electric line having a first contact connection portion and a second electric line having a second contact connection portion, the line connector comprising:

an enclosing tube surrounding the first electric line and having an end portion, the end portion being embedded in a plastic extrusion coat, the plastic extrusion coat being formed about the first and second contact connection portions;

a sealing device situated on the end portion of the enclosing tube, the sealing device including a seal element; and a clamping device radially pressing the seal element on the enclosing tube, the clamping device being encased by the plastic extrusion coat.

2. The line connector according to claim 1, wherein the clamping device is formed by a housing accommodating the seal element.

3. The line connector according to claim 1, wherein the clamping device includes a first connection part and a second connection part which generate a radial pressure of the seal element on the enclosing tube.

4. The line connector according to claim 3, wherein one of the two parts of the housing is axially latchable to another one of the two parts.

5. The line connector according to claim 1, wherein at least one of an inner side of the clamping device and an outer side of the seal element at least partially forms an abutting wedge for applying a force to the seal element.

6. The line connector according to claim 2, wherein the housing and the plastic extrusion coat are composed of a same material.

7. The line connector according to claim 2, further comprising a collar provided on the enclosing tube, wherein one of an end portion of the housing and an end portion of the seal element abuts against the collar.

8. The line connector according to claim 7, wherein the collar includes an annular collar.

9. The line connector according to claim 1, further comprising:

an inner-conductor positioning part coated by the plastic extrusion coat and being braced against the clamping device.

10. The line connector according to claim 9, wherein the inner-conductor positioning part is latched on the clamping device.

11. The line connector according to claim 8, wherein the annular collar has at least one of a non-circular surface area and a non-flat surface area.

12. The line connector according to claim 1, wherein the first electric line includes a high-temperature line of a measuring sensor.

13. The line connector according to claim 12, wherein the second electric line includes a PTFE-insulated line of a wiring harness.

14. The line connector according to claim 1, wherein the enclosing tube is a metal tube.

15. The line connector according to claim 3, wherein the first connecting part is designed for axially latching to the second connecting part.

16. A line connector connecting a first electric line having a first contact connection portion and a second electric line having a second contact connection portion, the line connector comprising:

an enclosing tube surrounding the first electric line and having an end portion, the end portion being embedded in a plastic extrusion coat, the plastic extrusion coat being formed about the first and second contact connection portions;

a sealing device situated on the end portion of the enclosing tube, the sealing device including a seal element; and a clamping device radially pressing the seal element on the enclosing tube, the clamping device being encased by the plastic extrusion coat and being formed by a housing accommodating the seal element.

* * * * *

UNITED STATES PATENT AND TRADEMARK OFFICE

CERTIFICATE OF CORRECTION

PATENT NO. : 6,045,403
DATED : April 4, 2000
INVENTOR(S) : Werner et al.

It is certified that error appears in the above-identified patent and that said Letters Patent is hereby corrected as shown below:

Column 1,
Line 1, change "...invention present..." to -- ...present invention... --.
Line 54, change "...invention present..." to -- ...present invention... --.

Column 2,
Line 9, change "... A..." to -- ...An... --.

Column 3,
Line 26, change "... connect..." to -- ... connects... --.
Line 54, change "... gradation..." to -- ... gradations... --.
Line 64, change "...seal." to -- ... seal 12. --.

Column 5,
Line 35, change "... invention present..." to -- ...present invention... --.
Line 44, change "... describe..." to -- ... described... --.
Line 50, change "... invention present..." to -- ... present invention... --.
Line 61, change "... describe..." to -- ... described... --.

Signed and Sealed this

Twenty-first Day of August, 2001

*Attest:*

Nicholas P. Godici

NICHOLAS P. GODICI

*Attesting Officer*

*Acting Director of the United States Patent and Trademark Office*